W. A. HAUGHWOUT.
CHAIN CONNECTING LINK.
APPLICATION FILED JULY 21, 1920.
1,380,903.  Patented June 7, 1921.
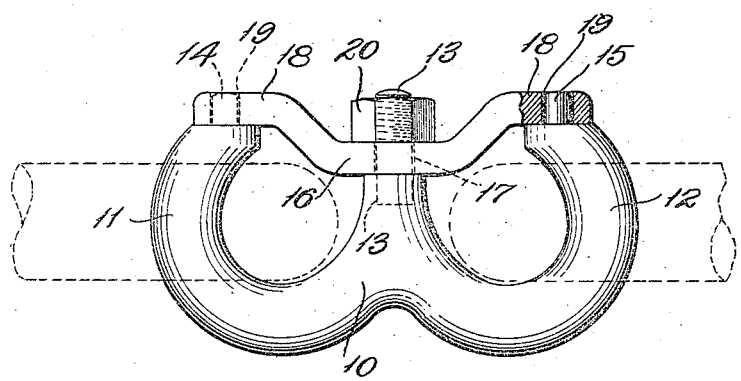
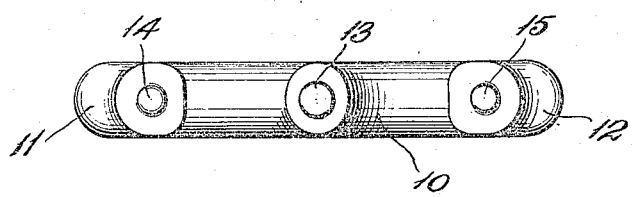
Inventor
Wm. A. Haughwout,

UNITED STATES PATENT OFFICE.

WILLIAM AUSTIN HAUGHWOUT, OF FORTYFORT, PENNSYLVANIA.

CHAIN-CONNECTING LINK.

1,380,903.  Specification of Letters Patent.  Patented June 7, 1921.

Application filed July 21, 1920. Serial No. 398,005.

*To all whom it may concern:*

Be it known that I, WILLIAM A. HAUGHWOUT, a citizen of the United States, residing at Fortyfort, in the county of Luzerne and State of Pennsylvania, have invented certain new and useful Improvements in Chain-Connecting Links, of which the following is a specification.

This invention relates to improvements in chain connecting links and more particularly to a connecting link that may be used in connection with chains of different sizes and construction and which when in place will insure against breakage of the chain at that point.

A further object of the invention is to provide a connecting link of the above character which is strong and durable, cheap to manufacture, and which may be attached or detached to or from the chain or chains with comparative ease.

Various other objects and advantages of my invention will become apparent during the continuance of the following description.

In the drawings:

Figure 1 is a view in side elevation showing my invention in its preferred embodiment; the bridle of the link being shown in locking position.

Fig. 2 is a view in top plan of the connecting link showing the bridle removed.

In reducing my invention to practice, I first provide a body portion 10 having suitably curved end or hook portions 11 and 12 formed integral therewith. In fact the body of the connecting link together with the end or hook portions 11 and 12 may be drop forged or otherwise formed in one piece. Upon reference to Fig. 1 it will be noted that the central portion of the body 10 terminates in a plane slightly below the plane of the free end of the hook portions 11 and 12. The purpose of this particular construction will be hereinafter pointed out.

The central portion 10 of the connecting link is provided with the upstanding bridle post 13 while the ends of the hook portions 11 and 12 are provided with upstanding bridle dowels 14 and 15 respectively.

The bridle portion of my invention consists of a pressed or stamped member having a body portion 16 provided with an opening 17 for the reception of the bridle post 13 and having its end portions bent to form offsets 18 which are in turn provided with openings 19 for the reception of bridle dowels 14 and 15 of the connecting link. By reason of the peculiar construction of the bridle 16 the central or body portion thereof lies snugly against the body portion 10 of the connecting link in a plane considerably lower than the offset end portions 18 thereof. As will be observed upon reference to Fig. 1 the bridle post 13 projects through the opening 17 of the bridle to a point approximately mid-way the dowel members 14 and 15 and terminates in a plane substantially level with the upper plane of the offset portion 18 of the bridle. This will enable the operator to place a nut or other securing member 20 on the bridle post 13 to securely fasten the bridle into position. However, it will be observed that this nut or fastening member lies below the offset end of the bridle thus being protected inasmuch as no portion thereof or nut portion of the bridle post projects beyond the plane of the offset end of the bridle.

By loosening the nut or fastening member 20 the bridle 16 may be elevated so as to disengage the openings 19 thereof from the dowel members 14 and 15 thus permitting the bridle to be given a half turn. The end of the chain can then be connected with the end or hook members 11 and 12 of the connecting link and the bridle again placed in its original position so as to form a secure connecting member.

What is claimed is:

In a chain connecting link, a body portion, hook portions formed on said body portion, dowels projecting from said hook portions, a bridle post having a threaded end carried by said body portion, a bridle connecting the ends of said hook portions and adapted to fit over said bridle post said bridle being provided with openings to receive said dowels, and means adapted to fasten said bridle securely in place, comprising a nut adapted to engage the threaded ends of said bridle post, as described.

In testimony whereof I affix my signature.

WILLIAM AUSTIN HAUGHWOUT.